(12) United States Patent
Geyer et al.

(10) Patent No.: US 12,448,004 B2
(45) Date of Patent: Oct. 21, 2025

(54) VEHICLE OF INTEREST DETECTION BY AUTONOMOUS VEHICLES BASED ON AMBER ALERTS

(71) Applicant: TuSimple, Inc., San Diego, CA (US)

(72) Inventors: Daniel Travis Geyer, Tucson, AZ (US); Gary Lee McCarthy, Jr., Flower Mound, TX (US)

(73) Assignee: TUSIMPLE, INC., San Diego, CA (US)

( * ) Notice: Subject to any disclaimer, the term of this patent is extended or adjusted under 35 U.S.C. 154(b) by 253 days.

(21) Appl. No.: 18/187,045

(22) Filed: Mar. 21, 2023

(65) Prior Publication Data

US 2023/0303122 A1 Sep. 28, 2023

Related U.S. Application Data

(60) Provisional application No. 63/269,889, filed on Mar. 24, 2022.

(51) Int. Cl.
| | |
|---|---|
| *B60W 60/00* | (2020.01) |
| *G06K 7/14* | (2006.01) |
| *G06V 20/58* | (2022.01) |
| *G06V 20/62* | (2022.01) |
| *H04W 4/44* | (2018.01) |
| *H04W 4/90* | (2018.01) |

(52) U.S. Cl.
CPC ....... *B60W 60/0017* (2020.02); *G06K 7/1417* (2013.01); *G06V 20/58* (2022.01); *G06V 20/625* (2022.01); *H04W 4/44* (2018.02); *H04W 4/90* (2018.02); *B60W 2420/403* (2013.01); *B60W 2420/408* (2024.01); *B60W 2756/10* (2020.02); *G06V 2201/08* (2022.01)

(58) Field of Classification Search
CPC ....... B60W 60/0017; B60W 2420/403; B60W 2420/408; B60W 2756/10; G06K 7/1417; G06V 20/58; G06V 20/625; G06V 2201/08; H04W 4/44; H04W 4/90
USPC ......................................................... 701/23
See application file for complete search history.

(56) References Cited

U.S. PATENT DOCUMENTS

| | | | |
|---|---|---|---|
| 11,922,734 B1 * | 3/2024 | Kellett | G07C 5/085 |
| 2018/0059669 A1 * | 3/2018 | Madigan | H04W 4/029 |
| 2018/0335785 A1 * | 11/2018 | Miller | G08G 1/017 |
| 2019/0096215 A1 * | 3/2019 | Shahid | G08G 1/09626 |
| 2020/0043326 A1 | 2/2020 | Tao et al. | |
| 2020/0334467 A1 * | 10/2020 | Guo | H04N 23/61 |

(Continued)

FOREIGN PATENT DOCUMENTS

| | | |
|---|---|---|
| EP | 3162096 B1 | 8/2018 |
| WO | 2016003430 A1 | 1/2016 |

OTHER PUBLICATIONS

Extended European search report dated Jul. 28, 2023 with cover page EP 3 162 096 AO.

*Primary Examiner* — Krishnan Ramesh
(74) *Attorney, Agent, or Firm* — Perkins Coie LLP

(57) ABSTRACT

A system comprises an autonomous vehicle and a control device associated with the autonomous vehicle. The autonomous vehicle comprises sensors. The control device accesses sensor data captured by the sensors. The control device identifies a vehicle of interest from the sensor data. The control device communicates information associated with the vehicle of interest to at least one of an oversight server and a third party.

18 Claims, 6 Drawing Sheets

(56) References Cited

U.S. PATENT DOCUMENTS

| | | |
|---|---|---|
| 2020/0393828 A1 | 12/2020 | Hoofar et al. |
| 2021/0035442 A1* | 2/2021 | Baig .................... G08G 1/0116 |
| 2022/0080985 A1 | 3/2022 | Brown et al. |
| 2022/0230487 A1* | 7/2022 | Saal ..................... G07C 5/0825 |
| 2023/0230430 A1* | 7/2023 | Andreasen ............... G07C 5/04 |
| | | 701/29.6 |
| 2023/0256997 A1* | 8/2023 | Lee .......................... G06N 3/08 |
| | | 701/23 |

* cited by examiner

VEHICLE OF INTEREST DETECTION BY AUTONOMOUS VEHICLES BASED ON AMBER ALERTS

RELATED APPLICATION AND CLAIM TO PRIORITY

This application claims priority to U.S. Provisional Application No. 63/269,889 filed Mar. 24, 2022, and titled "VEHICLE OF INTEREST DETECTION BY AUTONOMOUS VEHICLES BASED ON AMBER ALERTS," which is incorporated herein by reference.

TECHNICAL FIELD

The present disclosure relates generally to autonomous vehicles. More particularly, the present disclosure is related to a vehicle of interest detection by autonomous vehicles based on amber alerts.

BACKGROUND

An Amber alert is issued to notify people about a vehicle that is known to be associated with illegal activity. An autonomous vehicle may be equipped with sensors that can identify a vehicle of interest indicated in an amber alert.

SUMMARY

This disclosure recognizes various problems and previously unmet needs related to detecting vehicles indicated in amber alerts. Certain embodiments of the present disclosure provide unique technical solutions to technical problems of current autonomous vehicle technologies, including those problems described above to identify a vehicle of interest that is among vehicles indicated in amber alerts.

The present disclosure contemplates systems and methods for identifying a vehicle of interest that is among vehicles indicated in amber alerts and reporting the vehicle of interest to an oversight server associated with an autonomous vehicle and/or a third party.

In an example scenario, assume that an autonomous vehicle is traveling along a road. The autonomous vehicle may encounter multiple vehicles along the road. The control device associated with the autonomous vehicle may receive sensor data from sensors of the autonomous vehicle. The sensor data may include data indicating a vehicle of interest, e.g., an image of at least a portion of the vehicle of interest, an image of at least a portion of a license plate associated with the vehicle of interest. The control device may perform one or more operations below for each encountered vehicle.

The control device may identify the vehicle of interest from the sensor data. The control device may determine vehicle information associated with the vehicle of interest. The vehicle information may represent physical attributes, behavioral attributes, and/or driving patterns associated with the vehicle of interest.

The control device may compare the vehicle of interest with each vehicle indicated in each amber alert. Each amber alert may include text description and/or an image of a vehicle known to be associated with illegal activity. The control device may access the amber alert by accessing one or more sources, such as an amber alert database, an oversight server, another autonomous vehicle, a road sign where an amber alert is indicated, a website associated with amber alerts (from the Internet), and/or any other sources.

The control device determines whether the vehicle of interest corresponds to a vehicle indicated in an amber alert. If the control device determines that the vehicle of interest corresponds to a vehicle indicated in an amber alert, the control device may report the vehicle information associated with the vehicle of interest to one or both of an oversight server and a third party. The third party may include a regional law enforcement, a database, a service company (that provides a service and/or a product to vehicle users), a roadside assistance entity, or any combination thereof. Otherwise, the control device compares the vehicle of interest with another vehicle indicated in another amber alert and performs a similar operation. In this manner, the disclosed system may notify authorities that the vehicle of interest indicated in an amber alert is detected at a particular location and a particular time. The disclosed system may provide other information about the vehicle of interest to the authorities, such as a direction of travel, speed, driving behavior, vehicle make, vehicle model, vehicle color, and vehicle type.

Accordingly, the disclosed system may be integrated into a practical application of improving the driving experience for the autonomous vehicle and other vehicles traveling on the same road as the autonomous vehicle where the vehicle of interest is detected. For example, upon notifying the authorities about the vehicle of interest, the authorities may initiate capturing the vehicle of interest. Thus, the vehicle of interest exhibiting unsafe driving patterns may be removed from the road by the authorities. Therefore, the disclosed system may allow a safer road and a safer driving experience for the autonomous vehicle and other vehicles.

In certain embodiments, a fleet of autonomous vehicles may encounter the same vehicle of interest as they travel on one or more roads. Thus, each autonomous vehicle in the fleet may capture and communicate vehicle information associated with the vehicle of interest to the oversight server and/or the third party. Therefore, the fleet of autonomous vehicles may provide a plurality of vehicle information associated with the vehicle of interest. This information may be used for accurate tracking of the vehicle of interest, for example, on one or more roads as well as in traffic. As such, the disclosed system may be integrated into an additional practical application of tracking the vehicle of interest on one or more roads as well as in traffic.

In one embodiment, a system comprises an autonomous vehicle configured to travel along a road, where the autonomous vehicle comprises at least one sensor.

The system further comprises a control device associated with the autonomous vehicle. The control device comprises a processor. The processor is configured to access sensor data captured by the at least one sensor. The processor identifies a vehicle of interest from the sensor data. The processor communicates information associated with the vehicle of interest to at least one of an oversight server and a third party.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient, reliable, and safe solutions for an autonomous vehicle to report a vehicle of interest to authorities based on amber alerts. The present disclosure provides various systems, methods, and devices to report a vehicle of interest to authorities based on amber alerts.

Example System to Report a Vehicle of Interest Based on Amber Alerts

Figure 1:
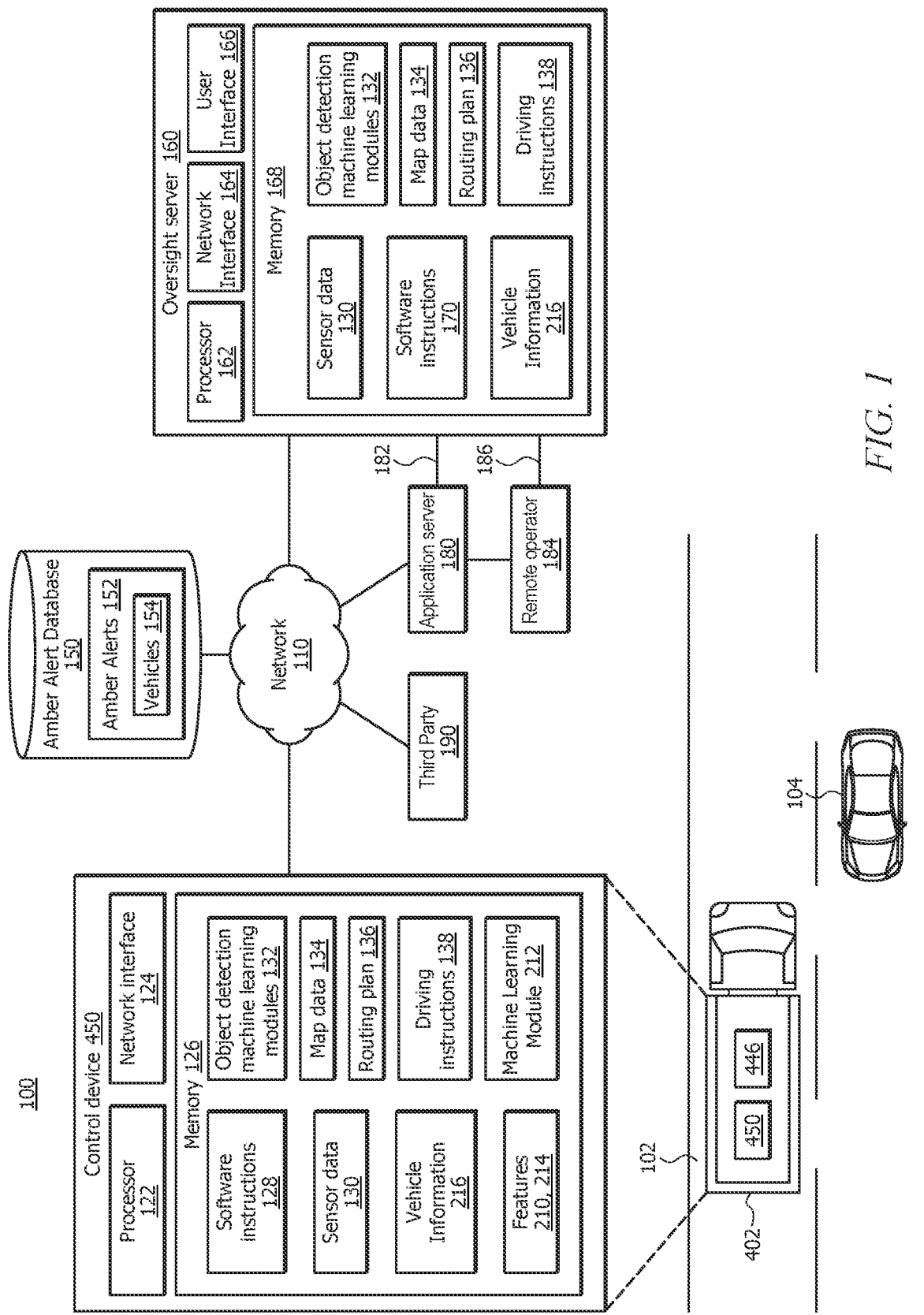
FIG. 1 illustrates an embodiment of a system to report a vehicle of interest to authorities based on amber alerts.

FIG. 1 illustrates an embodiment of a system 100 configured to report a vehicle of interest 104 to authorities (e.g., a third party 190) based on amber alerts 152. FIG. 1 further illustrates a simplified schematic diagram of a road 102 traveled by an autonomous vehicle 402 where the autonomous vehicle 402 encounters a vehicle of interest 104 (interchangeably referred to herein as vehicle 104). In certain embodiments, system 100 may comprise an autonomous vehicle 402 communicatively coupled with an amber alert database 150, an oversight server 160, and an application server 180 via a network 110. Network 110 enables communication among components of the system 100. Network 110 allows the autonomous vehicle 402 to communicate with other autonomous vehicles 402, systems, servers, databases, devices, etc. Control device 450 comprises a processor 122 in signal communication with a memory 126. Memory 126 stores software instructions 128 that when executed by the processor 122, cause the control device 450 to perform one or more operations described herein. For example, when the software instructions 128 are executed, the control device 450 identifies a vehicle of interest 104 based on sensor data 130 and reports the vehicle of interest 104 to an oversight server 160 and/or a third party 190. Oversight server 160 comprises a processor 162 in signal communication with a memory 168. Memory 168 stores software instructions 170 that when executed by the processor 162, cause the oversight server 160 to perform one or more operations described herein. Amber alert database 150 stores amber alerts 152 that may be used by the control device 450 and the oversight server 160. In other embodiments, system 100 may not have all of the components listed and/or may have other elements instead of, or in addition to, those listed above. System 100 may be configured as shown or in any other configuration.

In some cases, while traveling along a road 102, an autonomous vehicle 402 may encounter a vehicle of interest 104 that may be one of the vehicles 154 indicated in amber alerts 152. System 100 allows identifying the vehicle of interest 104, determining whether the vehicle of interest 104 is one of the vehicles 154 indicated in amber alerts 152, and in response to determining that the vehicle of interest 104 is one of the vehicles 154, report the vehicle of interest 104 to the oversight server 160 and/or the third party 190, such as law enforcement. In this manner, respective authorities may initiate removing the vehicle of interest from the road. Thus, system 100 is configured to provide a safer road and driving experience for the autonomous vehicle 402 and other vehicles.

System Components

Network 110 may include any interconnecting system capable of transmitting audio, video, signals, data, messages, or any combination of the preceding. Network 110 may include all or a portion of a local area network (LAN), a wide area network (WAN), a metropolitan area network (MAN), a personal area network (PAN), a wireless PAN (WPAN), an overlay network, a software-defined network (SDN), a virtual private network (VPN), a packet data network (e.g., the Internet), a mobile telephone network (e.g., cellular networks, such as 4G or 5G), a plain old telephone (POT) network, a wireless data network (e.g., WiFi, WiGig, WiMax, etc.), a long term evolution (LTE) network, a universal mobile telecommunications system (UMTS) network, a peer-to-peer (P2P) network, a Bluetooth network, a near field communication (NFC) network, a Zigbee network, a Z-wave network, a WiFi network, and/or any other suitable network.

Example Autonomous Vehicle

Figure 4:
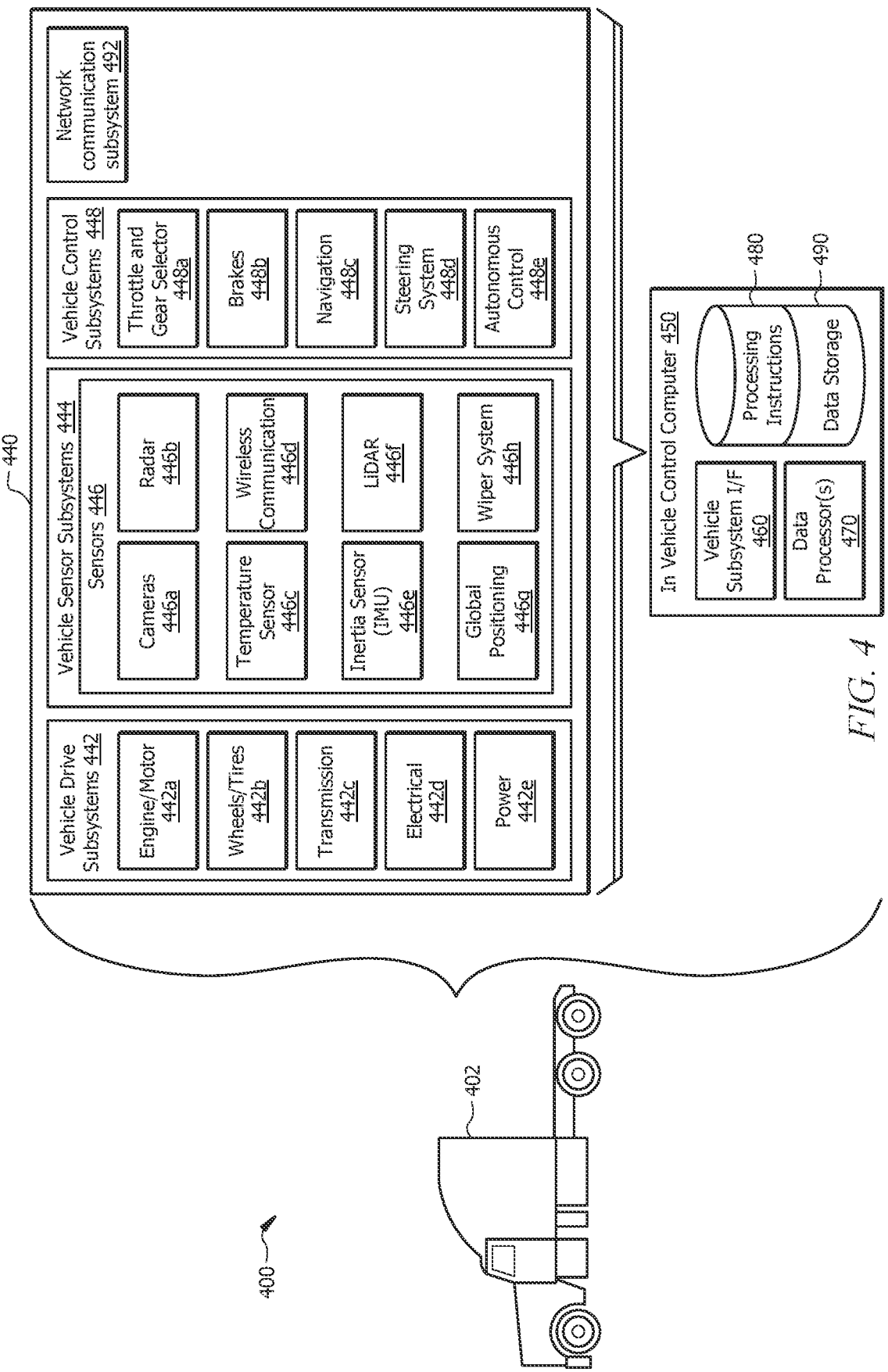
FIG. 4 illustrates a block diagram of an example autonomous vehicle configured to implement autonomous driving operations.

In one embodiment, the autonomous vehicle 402 may include a semi-truck tractor unit attached to a trailer to transport cargo or freight from one location to another location (see FIG. 4). The autonomous vehicle 402 is generally configured to travel along a road 102 in an autonomous mode. The autonomous vehicle 402 may navigate using a plurality of components described in detail in FIGS. 4-6. The operation of the autonomous vehicle 402 is described in greater detail in FIGS. 4-6. The corresponding description below includes brief descriptions of certain components of the autonomous vehicle 402.

Control device 450 may be generally configured to control the operation of the autonomous vehicle 402 and its components and to facilitate autonomous driving of the autonomous vehicle 402. The control device 450 may be further configured to determine a pathway in front of the autonomous vehicle 402 that is safe to travel and free of objects or obstacles, and navigate the autonomous vehicle 402 to travel in that pathway. This process is described in more detail in FIGS. 4-6. The control device 450 may generally include one or more computing devices in signal communication with other components of the autonomous vehicle 402 (see FIG. 4). In this disclosure, the control device 450 may interchangeably be referred to as an in-vehicle control computer 450.

The control device 450 may be configured to detect objects on and around road 102 by analyzing the sensor data 130 and/or map data 134. For example, the control device 450 may detect objects on and around road 102 by implementing object detection machine learning modules 132. The object detection machine learning modules 132 may be implemented using neural networks and/or machine learning algorithms for detecting objects from images, videos, infrared images, point clouds, radar data, etc. The object detection machine learning modules 132 are described in more detail further below. The control device 450 may receive sensor data 130 from the sensors 446 positioned on the autonomous vehicle 402 to determine a safe pathway to travel. The sensor data 130 may include data captured by the sensors 446.

Sensors 446 may be configured to capture any object within their detection zones or fields of view, such as landmarks, lane markers, lane boundaries, road boundaries, vehicles, pedestrians, road/traffic signs, among others. In some embodiments, the sensors 446 may be configured to detect rain, fog, snow, and/or any other weather condition.

The sensors 446 may include rain sensors, cameras, infrared cameras, light detection and ranging (LiDAR) sensors, motion sensors, infrared sensors, and the like. In some embodiments, the sensors 446 may be positioned around the autonomous vehicle 402 to capture the environment surrounding the autonomous vehicle 402. See the corresponding description of FIG. 4 for further description of the sensors 446.

Control Device

The control device 450 is described in greater detail in FIG. 4. In brief, the control device 450 may include the processor 122 in signal communication with the memory 126 and a network interface 124. The processor 122 may include one or more processing units that perform various functions as described herein. The memory 126 may store any data and/or instructions used by the processor 122 to perform its functions. For example, the memory 126 may store software instructions 128 that when executed by the processor 122 causes the control device 450 to perform one or more functions described herein.

The processor 122 may be one of the data processors 470 described in FIG. 4. The processor 122 comprises one or more processors operably coupled to the memory 126. The processor 122 may be any electronic circuitry, including state machines, one or more central processing unit (CPU) chips, logic units, cores (e.g., a multi-core processor), field-programmable gate arrays (FPGAs), application-specific integrated circuits (ASICs), or digital signal processors (DSPs). The processor 122 may be a programmable logic device, a microcontroller, a microprocessor, or any suitable combination of the preceding. The processor 122 may be communicatively coupled to and in signal communication with the network interface 124 and memory 126. The one or more processors may be configured to process data and may be implemented in hardware or software. For example, the processor 122 may be 8-bit, 16-bit, 32-bit, 64-bit, or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors may be configured to implement various instructions. For example, the one or more processors may be configured to execute software instructions 128 to implement the functions disclosed herein, such as some or all of those described with respect to FIGS. 1-6. In some embodiments, the function described herein is implemented using logic units, FPGAs, ASICs, DSPs, or any other suitable hardware or electronic circuitry.

Network interface 124 may be a component of the network communication subsystem 492 described in FIG. 4. The network interface 124 may be configured to enable wired and/or wireless communications. The network interface 124 may be configured to communicate data between the autonomous vehicle 402 and other devices, systems, or domains. For example, the network interface 124 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 122 may be configured to send and receive data using the network interface 124. The network interface 124 may be configured to use any suitable type of communication protocol as would be appreciated by one of ordinary skill in the art.

The memory 126 may be one of the data storages 490 described in FIG. 4. The memory 126 may be volatile or non-volatile and may comprise read-only memory (ROM), random-access memory (RAM), ternary content-addressable memory (TCAM), dynamic random-access memory (DRAM), and static random-access memory (SRAM). The memory 126 may include one or more of a local database, cloud database, network-attached storage (NAS), etc. The memory 126 may store any of the information described in FIGS. 1-6 along with any other data, instructions, logic, rules, or code operable to implement the function(s) described herein when executed by processor 122. For example, the memory 126 may store software instructions 128, sensor data 130, object detection machine learning module 132, map data 134, routing plan 136, driving instructions 138, features 210, 214, vehicle information 216, machine learning module 212, and/or any other data/instructions. The software instructions 128 include code that when executed by the processor 122 causes the control device 450 to perform the functions described herein, such as some or all of those described in FIGS. 1-6. The memory 126 comprises one or more disks, tape drives, or solid-state drives, and may be used as an over-flow data storage device, to store programs when such programs are selected for execution, and to store instructions and data that are read during program execution.

Object detection machine learning modules 132 may be implemented by the processor 122 executing software instructions 128, and may be generally configured to detect objects and obstacles from the sensor data 130. The object detection machine learning modules 132 may be implemented using neural networks and/or machine learning algorithms for detecting objects from any data type, such as images, videos, infrared images, point clouds, Radar data, etc.

In some embodiments, the object detection machine learning modules 132 may be implemented using machine learning algorithms, such as Support Vector Machine (SVM), Naive Bayes, Logistic Regression, k-Nearest Neighbors, Decision Trees, or the like. In some embodiments, the object detection machine learning modules 132 may utilize a plurality of neural network layers, convolutional neural network layers, Long-Short-Term-Memory (LSTM) layers, Bi-directional LSTM layers, recurrent neural network layers, and/or the like, in which weights and biases of these layers are optimized in the training process of the object detection machine learning modules 132. The object detection machine learning modules 132 may be trained by a training dataset that may include samples of data types labeled with one or more objects in each sample. For example, the training dataset may include sample images of objects (e.g., vehicles, lane markings, pedestrians, road signs, obstacles, etc.) labeled with object(s) in each sample image. Similarly, the training dataset may include samples of other data types, such as videos, infrared images, point clouds, Radar data, etc. labeled with object(s) in each sample data. The object detection machine learning modules 132 may be trained, tested, and refined by the training dataset and the sensor data 130. The object detection machine learning modules 132 use the sensor data 130 (which are not labeled with objects) to increase their accuracy of predictions in detecting objects. For example, supervised and/or unsupervised machine learning algorithms may be used to validate the predictions of the object detection machine learning modules 132 in detecting objects in the sensor data 130.

Map data 134 may include a virtual map of a city or an area that includes the road 102. In some examples, the map data 134 may include the map 558 and map database 536 (see FIG. 5 for descriptions of the map 558 and map database 536). The map data 134 may include drivable areas, such as roads 102, paths, highways, and undrivable areas, such as terrain (determined by the occupancy grid module 560, see FIG. 5 for descriptions of the occupancy grid module 560). The map data 134 may specify location coordinates of road signs, lanes, lane markings, lane boundaries, road boundaries, traffic lights, obstacles, etc.

Routing plan 136 may be a plan for traveling from a start location (e.g., a first autonomous vehicle launchpad/landing pad) to a destination (e.g., a second autonomous vehicle launchpad/landing pad). For example, the routing plan 136 may specify a combination of one or more streets, roads, and highways in a specific order from the start location to the destination. The routing plan 136 may specify stages, including the first stage (e.g., moving out from a start location/launch pad), a plurality of intermediate stages (e.g., traveling along particular lanes of one or more particular street/road/highway), and the last stage (e.g., entering the destination/landing pad). The routing plan 136 may include other information about the route from the start position to the destination, such as road/traffic signs in that routing plan 136, etc.

Figure 5:
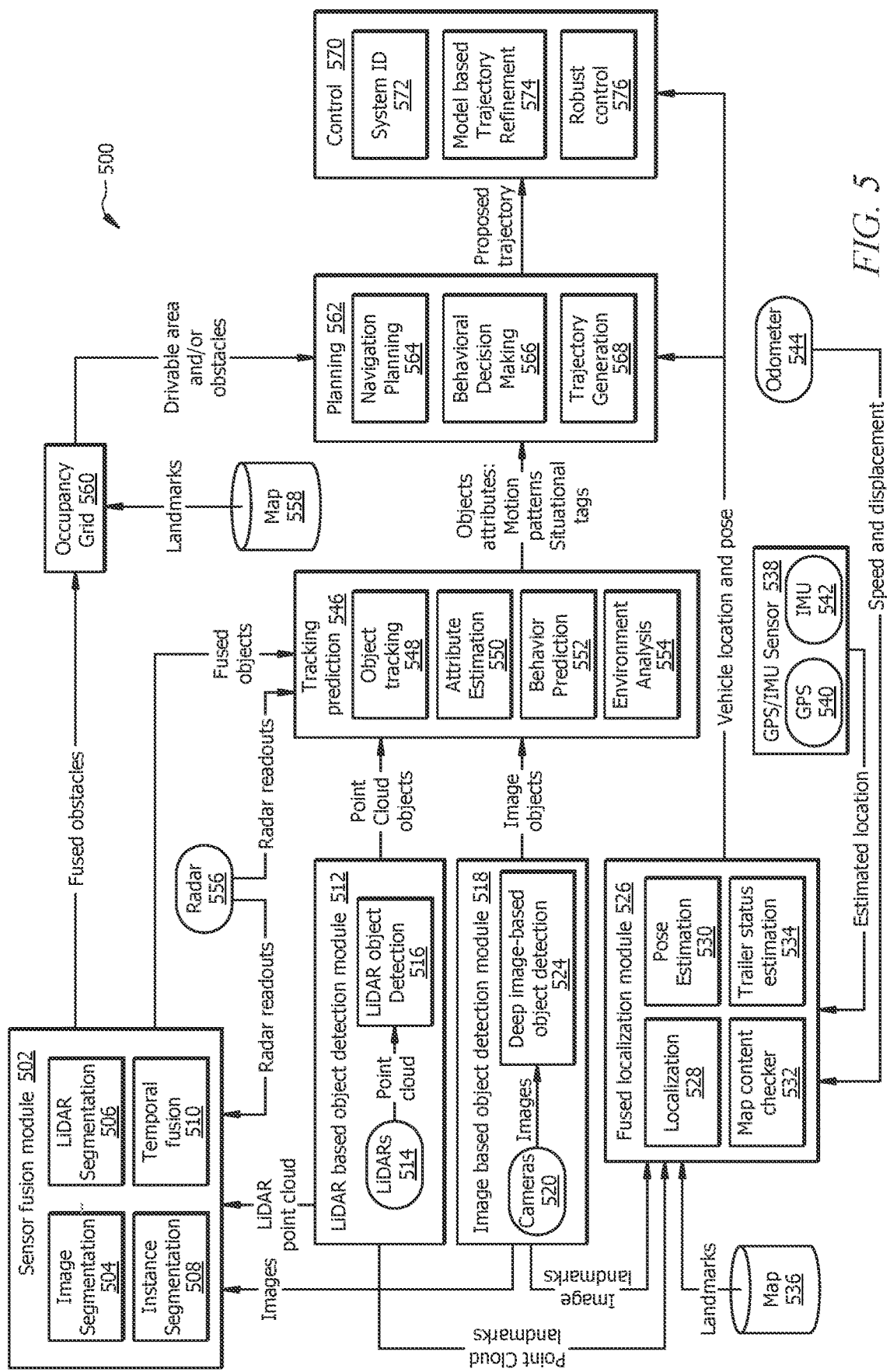
FIG. 5 illustrates an example system for providing autonomous driving operations used by the autonomous vehicle of FIG. 4.

Driving instructions 138 may be implemented by the planning module 562 (See descriptions of the planning module 562 in FIG. 5). The driving instructions 138 may include instructions and rules to adapt the autonomous driving of the autonomous vehicle 402 according to the driving rules of each stage of the routing plan 136. For example, the driving instructions 138 may include instructions to stay within the speed range of a road 102 traveled by the autonomous vehicle 402, adapt the speed of the autonomous vehicle 402 with respect to observed changes by the sensors 446, such as speeds of surrounding vehicles, objects within the detection zones of the sensors 446, etc.

Amber Alert Database

Amber alert database 150 generally comprises any storage architecture. Examples of the amber alert database 150 include, but are not limited to, a network-attached storage cloud, a storage area network, and a storage assembly directly (or indirectly) coupled to one or more components of the system 100. The amber alert database 150 may store active amber alerts 152 as issued by respective authorities, such as law enforcement.

In each amber alert 152, a vehicle 154 that is known to be associated with illegal activity (as indicated by law enforcement) may be indicated and/or described. In one example, an amber alert 152 may include text description of a vehicle 154, such as a color of the vehicle 154, a license plate number of the vehicle 154, a vehicle type, a vehicle model, a vehicle make, etc. In another example, an amber alert 152 may include one or more images of a vehicle 154. The amber alert database 150 may store any other type of alerts, such as community alerts, silver alerts, blue alerts, endangered missing persons alerts, camo alerts, clear alerts, CLEAR alerts, wireless emergency alerts, etc.

Although the amber alert database 150 is shown as an external device with respect to the control device 450 and the oversight server 160, in some embodiments, the amber alert database 150 may be maintained internally in one or both of the control device 450 and the oversight server 160.

Each of the control device 450 and the oversight server 160 is configured to store amber alerts 152 in the amber alert database 150.

With respect to the control device 450, the control device 450 may obtain one or more amber alerts 152 from the oversight server 160, one or more autonomous vehicles 402, a law enforcement entity, a website associated with amber alerts 152 (accessed from the Internet via the network 110), a road sign where an amber alert 152 is indicated, a text message via a cellular network (e.g., issued by law enforcement), a third party 190, and/or any other sources. The control device 450 may store the obtained amber alerts 152 in the amber alert database 150.

With respect to the oversight server 160, the oversight server 160 may obtain one or more amber alerts 152 from one or more autonomous vehicles 402, a law enforcement entity, a website associated with amber alerts 152 (accessed from the Internet via the network 110), a remote operator 184, and/or any other sources. The oversight server 160 may store the obtained amber alerts 152 in the amber alert database 150.

Oversight Server

Oversight server 160 may generally be configured to oversee the operations of the autonomous vehicle 402. The oversight server 160 may comprise a processor 162, a network interface 164, a user interface 166, and a memory 168. The components of the oversight server 160 are operably coupled to each other. The processor 162 may include one or more processing units that perform various functions as described herein. The memory 168 may store any data and/or instructions used by the processor 162 to perform its functions. For example, the memory 168 may store software instructions 170 that when executed by the processor 162 causes the oversight server 160 to perform one or more functions described herein. The oversight server 160 may be configured as shown or in any other suitable configuration.

In one embodiment, the oversight server 160 may be implemented by a cluster of computing devices that may serve to oversee the operations of the autonomous vehicle 402. For example, the oversight server 160 may be implemented by a plurality of computing devices using distributed computing and/or cloud computing systems. In another example, the oversight server 160 may be implemented by a plurality of computing devices in one or more data centers. As such, in one embodiment, the oversight server 160 may include more processing power than the control device 450. The oversight server 160 is in signal communication with the autonomous vehicle 402 and its components (e.g., the control device 450). In one embodiment, the oversight server 160 may be configured to determine a particular routing plan 136 for the autonomous vehicle 402. For example, the oversight server 160 may determine a particular routing plan 136 for an autonomous vehicle 402 that leads to reduced driving time and a safer driving experience for reaching the destination of the autonomous vehicle 402.

Processor 162 comprises one or more processors. The processor 162 is any electronic circuitry, including state machines, one or more central processing unit (CPU) chips, logic units, cores (e.g., a multi-core processor), field-programmable gate arrays (FPGAs), application-specific integrated circuits (ASICs), or digital signal processors (DSPs). The processor 162 may be a programmable logic device, a microcontroller, a microprocessor, or any suitable combination of the preceding. The processor 162 may be communicatively coupled to and in signal communication with the network interface 164, user interface 166, and memory 168. The one or more processors are configured to process data and may be implemented in hardware or software. For example, the processor 162 may be 8-bit, 16-bit, 32-bit, 64-bit or of any other suitable architecture. The processor 162 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 170 to implement the functions disclosed herein, such as some or all of those described with respect to FIGS. 1-6. In some embodiments, the function described herein may be implemented using logic units, FPGAs, ASICs, DSPs, or any other suitable hardware or electronic circuitry.

Network interface 164 may be configured to enable wired and/or wireless communications of the oversight server 160. The network interface 164 may be configured to communicate data between the oversight server 160 and other devices, autonomous vehicles 402, systems, or domains. For example, the network interface 164 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, and/or a router. The processor 162 may be configured to send and receive data using the network interface 164. The network interface 164 may be configured to use any suitable type of communication protocol as would be appreciated by one of ordinary skill in the art.

User interfaces 166 may include one or more user interfaces that are configured to interact with users, such as the remote operator 184. The remote operator 184 may access the oversight server 160 via the communication path 186. The user interfaces 166 may include peripherals of the oversight server 160, such as monitors, keyboards, mouse, trackpads, touchpads, microphones, webcams, speakers, and the like. The remote operator 184 may use the user interfaces 166 to access the memory 168 to review any data stored in the memory 168. The remote operator 184 may confirm, update, and/or override the routing plan 136, driving instructions 138, and/or any other data stored in memory 168.

Memory 168 may be volatile or non-volatile and may comprise read-only memory (ROM), random-access memory (RAM), ternary content-addressable memory (TCAM), dynamic random-access memory (DRAM), and static random-access memory (SRAM). The memory 168 may include one or more of a local database, cloud database, network-attached storage (NAS), etc. Memory 168 may store any of the information described in FIGS. 1-6 along with any other data, instructions, logic, rules, or code operable to implement the function(s) described herein when executed by processor 162. For example, the memory 168 may store software instructions 170, sensor data 130, object detection machine learning module 132, map data 134, routing plan 136, driving instructions 138, vehicle information 216, and/or any other data/instructions. The software instructions 170 may include code that when executed by the processor 162 causes the oversight server 160 to perform the functions described herein, such as some or all of those described in FIGS. 1-6. The memory 168 comprises one or more disks, tape drives, or solid-state drives, and may be used as an over-flow data storage device, to store programs when such programs are selected for execution, and to store instructions and data that are read during program execution.

Application Server

The application server 180 may be any computing device configured to communicate with other devices, such as the oversight server 160, autonomous vehicles 402, databases, etc., via the network 110. The application server 180 may be configured to perform functions described herein and interact with the remote operator 184, e.g., via communication path 182 using its user interfaces. Examples of the application server 180 include, but they are not limited to, desktop computers, laptop computers, servers, etc. In one example, the application server 180 may act as a presentation layer from which the remote operator 184 can access the oversight server 160. As such, the oversight server 160 may send the sensor data 130, map data 134, routing plan 136, driving instructions 138, vehicle information 216, and/or any other data/instructions to the application server 180, e.g., via the network 110. The remote operator 184, after establishing the communication path with the application server 180, may review the received data and confirm, update, and/or override any of the received data.

The remote operator 184 may be an individual who is associated with and has access to the oversight server 160. For example, the remote operator 184 may be an administrator that can access and view the information regarding the autonomous vehicle 402, such as sensor data 130, driving instructions 138, routing plan 136, and other information that is available on the memory 168. In one example, the remote operator 184 may access the oversight server 160 from the application server 180 that is acting as a presentation layer via the network 110.

Third party 190 may include a regional law enforcement agency (with respect to the autonomous vehicle 402 or the remote operator 184/the oversight server 160), a law enforcement agency, a database, a service company (that provides a service and/or a product to vehicle users), a roadside assistance entity, or any combination thereof. The third party 190 may be associated with a computing device (not shown) that is communicatively coupled with other components of the system 100. The third party 190 may use the computing device to communicate data to and from other components of the system 100, such as the control device 450 and oversight server 160.

Operational Flow for Reporting a Vehicle of Interest Based on Amber Alerts

Figure 2:
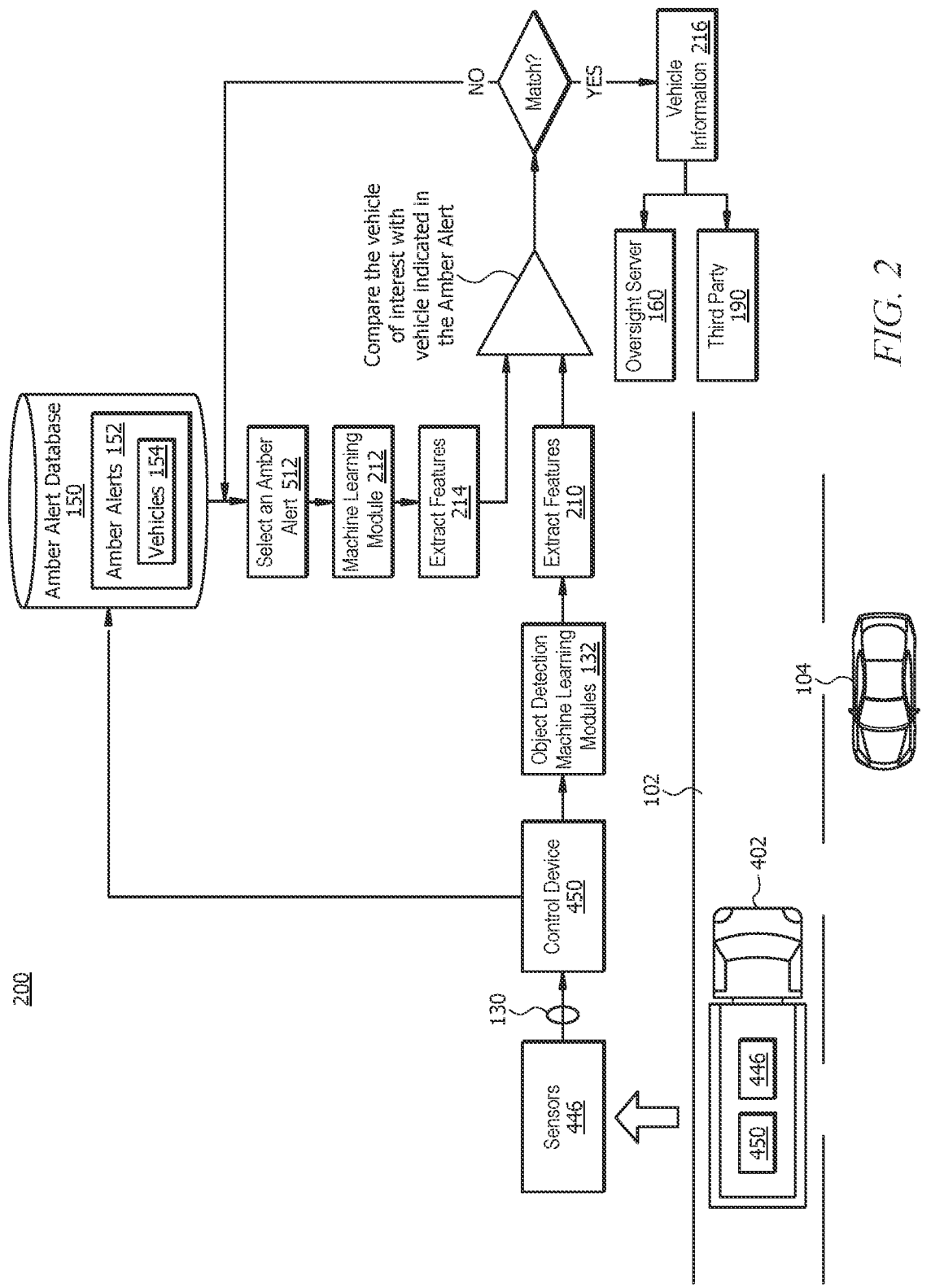
FIG. 2 illustrate an example operational flow of the system of FIG. 1 to report a vehicle of interest based on amber alerts.

FIG. 2 illustrates an example operational flow 200 of system 100 described in FIG. 1 for reporting a vehicle of interest 104 based on amber alerts 152. In an example scenario, while the autonomous vehicle 402 is traveling along a road 102, the autonomous vehicle 402 may encounter multiple vehicles 104. The sensors 446 may capture sensor data 130 that describe the environment around the autonomous vehicle 402. The sensors 446 communicate the sensor data 130 to the control device 450 to determine a safe traveling pathway for the autonomous vehicle 402. The operational flow 200 may begin when the sensors 446 capture sensor data 130 that includes data indicating a vehicle of interest 104. The sensors 446 communicate the sensor data 130 to the control device 450 for processing.

Identifying the Vehicle of Interest

Upon receiving the sensor data 130, the control device 450 processes the sensor data 130. To process the sensor data 130, the control device 450 may feed the sensor data 130 to the object detection machine learning modules 132. In certain embodiments, processing the sensor data 130 may include any number and combination of recording an image of at least a portion of the vehicle of interest 104, recording an image of at least a portion of a license plate number associated with the vehicle of interest 104, determining a color of the vehicle of interest 104, determining a vehicle type of the vehicle of interest 104, determining a vehicle make of the vehicle of interest 104, determining a vehicle model of the vehicle of interest 104, determining a direction of travel of the vehicle of interest 104, determining a speed of the vehicle of interest 104, determining a location where the vehicle of interest 104 is encountered, and determining a timestamp when the vehicle of interest 104 is encountered.

In certain embodiments, processing the sensor data 130 may include any other operations and methods to determine any other information about the vehicle of interest 104.

The control device 450 (e.g., via the object detection machine learning modules 132) may extract a set of features 210 from the sensor data 130, where the set of features 210 may represent the physical attributes, behavioral attributes, and/or driving patterns of the vehicle of interest 104. The set of features 210 may be represented by a vector or an embedding that comprises a set of numerical values.

The set of features 210 may represent a color, a vehicle type, a vehicle make, a vehicle model, a direction of travel, a speed, an encountering location, an encountering timestamp with respect to the vehicle of interest 104, and/or any other information about the vehicle of interest 104.

In certain embodiments, depending on an image quality of the vehicle of interest 104, the set of features 210 may further represent one or more persons in the vehicle of interest 104. For example, the set of features 210 may include data indicating facial features and/or clothing features of a driver and/or a passenger in the vehicle of interest 104.

Determining Whether the Vehicle of Interest Matches a Vehicle Indicated in an Amber Alert The control device 450 may perform one or more operations below to determine whether the vehicle of interest 104 matches (or corresponds to) a vehicle 154 indicated in an amber alert 152. In certain embodiments, the control device 450 may access or obtain one or more amber alerts 152 from one or more sources, similar to that described in FIG. 1. In one example, the control device 450 may access the amber alert database 150 that stores a plurality of amber alerts 152 associated with a plurality of vehicles 154 known to be associated with illegal activity (as indicated by respective authorities, such as law enforcement).

The control device 450 may process and analyze each amber alert 152. In this process, the control device 450 may select each amber alert 152 for evaluation. The control device 450 may iteratively select an amber alert 152 until no amber alert 152 is left for evaluation. The control device 450 may perform one or more of the following operations for each amber alert 152.

The control device 450 may feed the amber alert 152 to the machine learning module 212. In certain embodiments, the machine learning module 212 may include SVM, Naive Bayes, Logistic Regression, k-Nearest Neighbors, Decision Trees, or the like. In certain embodiments, the machine learning module 212 may be implemented by a plurality of neural network layers, convolutional neural network layers, LSTM layers, Bi-directional LSTM layers, recurrent neural network layers, and the like. In certain embodiments, the machine learning module 212 may include image processing, text processing, e.g., natural language processing.

The amber alert 152 may include text description and/or image(s) of a vehicle 154. Thus, the machine learning module 212 is configured to analyze the amber alert 152 that may be in text and/or image format.

The control device 450 may implement the machine learning module 212 to process the amber alert 152 and extract a set of features 214 from the amber alert 152. The set of features 214 is the output of the machine learning module 212. The set of features 214 may represent any information about the vehicle 154 that is described and/or indicated in the amber alert 152. For example, the set of features 214 may represent physical attributes associated with the vehicle 154 that is indicated in the amber alert 152. The set of features 214 may be represented by a vector or an embedding that comprises a set of numerical values.

The control device 450 determines whether the vehicle 154 corresponds to (or matches) the vehicle of interest 104. To this end, the control device 450 compares each feature 214 from among the set of features 214 with a counterpart feature 214 from among the set of features 214. In this process, the control device 450 may determine a percentage of the set of features 214 that corresponds to the set of features 214.

The control device 450 may compare the percentage of the set of features 214 that corresponds to the set of features 214 with a threshold percentage. The threshold percentage may be 70%, 75%, 85%, or any other value. If the control device 450 determines that the percentage of the set of features 214 that corresponds to the set of features 214 does not exceed the threshold percentage, the control device 450 determines that the vehicle of interest 104 does not correspond to (or does not match) the vehicle 154 indicated in the amber alert 152. In this case, the control device 450 may select another amber alert 152 for evaluation.

If, however, the control device 450 determines that the percentage of the set of features 214 that corresponds to the set of features 214 exceeds the threshold percentage, the control device 450 determines that the vehicle of interest 104 corresponds to (or matches) the vehicle 154 indicated in the amber alert 152. In this case, the control device 450 may communicate (e.g., report) vehicle information 216 associated with the vehicle of interest 104 to the oversight server 160 and/or the third party 190.

The vehicle information 216 may indicate physical attributes, behavioral attributes, and/or driving patterns and/or information associated with the vehicle of interest 104 determined from the sensor data 130. For example, the vehicle information 216 may include any number and combination of an image of at least a portion of the vehicle of interest 104, an image of at least a portion of a license plate associated with the vehicle of interest 104, a color of the vehicle of interest 104, a vehicle type of the vehicle of interest 104, a vehicle model of the vehicle of interest 104, a vehicle make of the vehicle of interest 104, a direction of travel of the vehicle of interest 104, a speed of the vehicle of interest 104, a location where the vehicle of interest 104 is encountered by the autonomous vehicle 402, and a timestamp when the vehicle of interest 104 is encountered by the autonomous vehicle 402. In this manner, the control device 450 may notify other entities (e.g., the oversight server 160 and the third party 190) that the vehicle of interest 104 is detected at a particular location and a particular time.

With respect to the third party 190, upon receipt of the vehicle information 216, the third party 190 may initiate pursuing the vehicle of interest 104 and removing the vehicle of interest 104 from the road 102. Thus, system 100 of FIG. 1 provides a safer road and driving experience for the autonomous vehicle 402 and other vehicles.

With respect to the oversight server 160, in certain embodiments, upon receipt of the vehicle information 216, the oversight server 160 and/or the remote operator 184 may confirm, update, or override any data indicated in the vehicle information 216. In response, the oversight server 160 may communicate the updated vehicle information 216 to the third party 190.

In certain embodiments, the control device 450 may communicate the vehicle information 216 to other autonomous vehicles 402 that, for example, would encounter the vehicle of interest 104 based on the location and direction of travel of the vehicle of interest 104, and the location and direction of travel of those autonomous vehicles 402. For example, the control device 450 may communicate the vehicle information 216 to other autonomous vehicles 402 that may be in the traveling path of the vehicle of interest 104. Each autonomous vehicle 402 may record vehicle information 216 about the vehicle of interest 104 and communicate to the oversight server 160 and/or the third party 190, similar to that described above. Thus, a plurality of vehicle information 216 captured by a fleet of autonomous vehicles 402 may be used to track the vehicle of interest 104 on one or more roads as well as among traffic.

In certain embodiments, the oversight server 160 may communicate the vehicle information 216 to other autonomous vehicles 402 that, for example, would encounter the vehicle of interest 104 based on the location and direction of travel of the vehicle of interest 104.

Use Case of Identifying a Vehicle of Interest Based on a OR Code

Although the operational flow 200 described in FIG. 2 describes a use case where the autonomous vehicle 402 encounters a vehicle of interest 104, gathers vehicle information 216 about the vehicle of interest 104, and reports the vehicle information 216 to the oversight server 160 and/or the third party 190 in response to determining that the vehicle of interest 104 is among the vehicles 154 indicated in amber alerts 152, the present disclosure contemplates other use cases.

For example, as another use case, the autonomous vehicle 402 may encounter a vehicle of interest 104 that may be stranded on a side of the road 102 or in is a road accident. The control device 450 gathers vehicle information 216 about the vehicle of interest 104 that may include a message encoded in a quick response (QR) code displayed on the vehicle of interest 104 and communicates the vehicle information 216 to the oversight server 160 and/or the third party 190.

For example, in an example scenario, while traveling along the road 102, the autonomous vehicle 402 may encounter a vehicle of interest 104 that is stranded on a side of the road 102 or is in a road accident. For example, the control device 450 may identify the vehicle of interest 104 and determine that the vehicle of interest 104 is stranded from sensor data 130 based on determining that the vehicle is on a side of the road 102 and not moving (based on processing the sensor data 130 via the object detection machine learning module 132).

The control device 450 may detect a QR code on the vehicle of interest 104. The QR code may be displayed on at least one of a window and a body of the vehicle of interest 104. The control device 450 may determine the vehicle information 216 encoded in the QR code. To this end, the control device 450 may capture an image of the QR code and implement a QR code reader to determine the vehicle information 216 encoded in the QR code. In this use case, besides a QR code, a bar code or any type of two-dimensional code may be used.

In this use case, the vehicle information 216 may include attributes associated with the vehicle of interest 104 and one or more instructions. The attributes associated with the vehicle of interest 104 may include a license plate number, a vehicle model, and/or other information associated with the vehicle of interest 104. The one or more instructions may include contacting the third party 190 with particular contact information, informing the third party 190 that the vehicle of interest 104 needs a particular service, where the particular service is associated with a gas shortage or a vehicle component malfunction. The one or more instructions may be preconfigured by a user of the vehicle of interest 104. The one or more instructions may be prioritized based on user's instructions.

Example Method for Reporting a Vehicle of Interest Based on Amber Alerts

Figure 3:
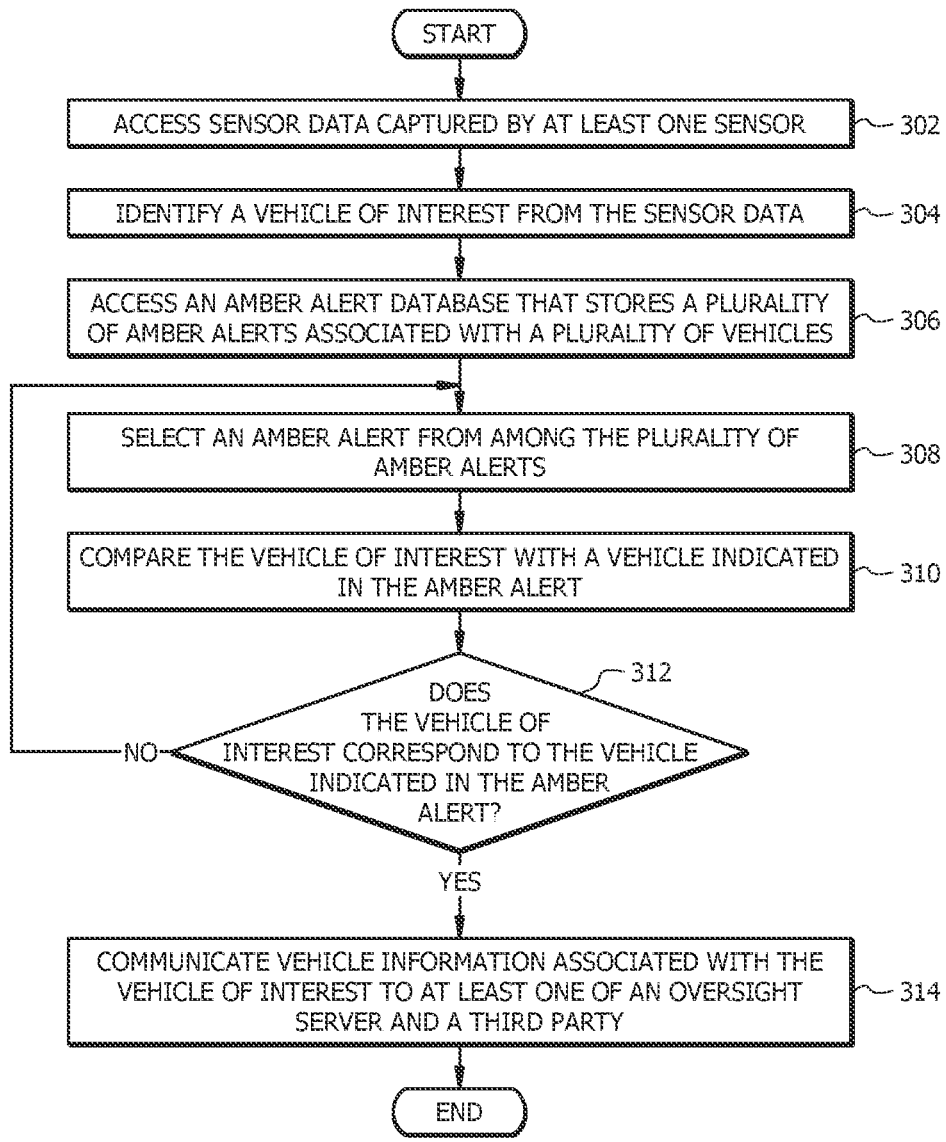
FIG. 3 illustrates an embodiment of a method for reporting a vehicle of interest to authorities based on amber alerts.

FIG. 3 illustrates an example flowchart of a method 300 for reporting a vehicle of interest 104 based on amber alerts 152. Modifications, additions, or omissions may be made to method 300. Method 300 may include more, fewer, or other operations. For example, operations may be performed in parallel or in any suitable order. While at times discussed as the autonomous vehicle 402, control device 450, or components of any of thereof performing operations, any suitable system or components of the system may perform one or more operations of the method 300. For example, one or more operations of method 300 may be implemented, at least in part, in the form of software instructions 128 and processing instructions 480, respectively, from FIGS. 1 and 4, stored on non-transitory, tangible, machine-readable media (e.g., memory 126 and data storage 490, respectively, from FIGS. 1 and 4) that when run by one or more processors (e.g., processors 122 and 470, respectively, from FIGS. 1 and 4) may cause the one or more processors to perform operations 302-314.

At 302, the control device 450 access the sensor data 130 captured by at least one sensor 446.

For example, while the autonomous vehicle 402 is traveling along a road 102, the sensors 446 capture sensor data 130 and communicate the sensor data 130 to the control device 450.

At 304, the control device 450 identifies a vehicle of interest 104 from the sensor data 130. For example, the control device 450 may feed the sensor data 130 to the object detection machine learning module 132 to identify the vehicle of interest 104, similar to that described in FIG. 2. The output of the object detection machine learning module 132 may be a set of features 210 that represent physical attributes, behavioral attributes, and/or driving patterns of the vehicle of interest 104.

At 306, the control device 450 accesses the amber alert database 150 that stores a plurality of amber alerts 152 associated with a plurality of vehicles 154, similar to that described in FIG. 2.

At 308, the control device 450 selects an amber alert 152 from among the plurality of amber alerts 152. The control device 450 may iteratively select an amber alert 152 until no amber alert 152 is left for evaluation. In this process, the control device 450 extracts a set of features 214 associated with vehicle 154 by feeding the amber alert 152 to the machine learning module 212, similar to that described in FIG. 2.

At 310, the control device 450 compares the vehicle of interest 104 with a vehicle 154 indicated in the amber alert 152. In this process, the control device 450 compares each feature 210 with a counterpart feature 214, similar to that described in FIG. 2.

At 312, the control device 450 determines whether the vehicle of interest 104 corresponds to the vehicle 154 indicated in the amber alert 152. If the control device 450 determines that the vehicle of interest 104 corresponds to the vehicle 154 indicated in the amber alert 152, method 300 proceeds to 314. Otherwise, method 300 returns to 308.

At 314, the control device 450 communicates vehicle information 216 associated with the vehicle of interest 104 to at least one of the oversight server 160 and the third party 190.

Example Autonomous Vehicle and its Operation

FIG. 4 shows a block diagram of an example vehicle ecosystem 400 in which autonomous driving operations can be determined. As shown in FIG. 4, the autonomous vehicle 402 may be a semi-trailer truck. The vehicle ecosystem 400 may include several systems and components that can generate and/or deliver one or more sources of information/data and related services to the in-vehicle control computer 450 that may be located in an autonomous vehicle 402. The in-vehicle control computer 450 can be in data communication with a plurality of vehicle subsystems 440, all of which can be resident in the autonomous vehicle 402. A vehicle subsystem interface 460 may be provided to facilitate data communication between the in-vehicle control computer 450 and the plurality of vehicle subsystems 540. In some embodiments, the vehicle subsystem interface 460 can include a controller area network (CAN) controller to communicate with devices in the vehicle subsystems 540.

The autonomous vehicle 402 may include various vehicle subsystems that support the operation of autonomous vehicle 402. The vehicle subsystems 540 may include a vehicle drive subsystem 442, a vehicle sensor subsystem 444, a vehicle control subsystem 448, and/or network communication subsystem 492. The components or devices of the vehicle drive subsystem 442, the vehicle sensor subsystem 444, and the vehicle control subsystem 448 shown in FIG. 4 are examples. The autonomous vehicle 402 may be configured as shown or any other configurations.

The vehicle drive subsystem 442 may include components operable to provide powered motion for the autonomous vehicle 402. In an example embodiment, the vehicle drive subsystem 442 may include an engine/motor 442a, wheels/tires 442b, a transmission 442c, an electrical subsystem 442d, and a power source 442e.

The vehicle sensor subsystem 444 may include a number of sensors 446 configured to sense information about an environment or condition of the autonomous vehicle 402. The vehicle sensor subsystem 444 may include one or more cameras 446a or image capture devices, a radar unit 446b, one or more temperature sensors 446c, a wireless communication unit 446d (e.g., a cellular communication transceiver), an inertial measurement unit (IMU) 446e, a laser range finder/LiDAR unit 446f, a Global Positioning System (GPS) transceiver 446g, a wiper control system 446h. The vehicle sensor subsystem 444 may also include sensors configured to monitor internal systems of the autonomous vehicle 402 (e.g., an O2 monitor, a fuel gauge, an engine oil temperature, etc.).

The IMU 446e may include any combination of sensors (e.g., accelerometers and gyroscopes) configured to sense position and orientation changes of the autonomous vehicle 402 based on inertial acceleration. The GPS transceiver 446g may be any sensor configured to estimate a geographic location of the autonomous vehicle 402. For this purpose, the GPS transceiver 446g may include a receiver/transmitter operable to provide information regarding the position of the autonomous vehicle 402 with respect to the Earth. The radar unit 446b may represent a system that utilizes radio signals to sense objects within the local environment of the autonomous vehicle 402. In some embodiments, in addition to sensing the objects, the radar unit 446b may additionally be configured to sense the speed and the heading of the objects proximate to the autonomous vehicle 402. The laser range finder or LiDAR unit 446f may be any sensor configured to use lasers to sense objects in the environment in which the autonomous vehicle 402 is located. The cameras 446a may include one or more devices configured to capture a plurality of images of the environment of the autonomous vehicle 402. The cameras 446a may be still image cameras or motion video cameras.

The vehicle control subsystem 448 may be configured to control the operation of the autonomous vehicle 402 and its components. Accordingly, the vehicle control subsystem 448 may include various elements such as a throttle and gear selector 448a, a brake unit 448b, a navigation unit 448c, a steering system 448d, and/or an autonomous control unit 448e. The throttle and gear selector 448a may be configured to control, for instance, the operating speed of the engine and, in turn, control the speed of the autonomous vehicle 402. The throttle and gear selector 448a may be configured to control the gear selection of the transmission. The brake unit 448b can include any combination of mechanisms configured to decelerate the autonomous vehicle 402. The brake unit 448b can slow the autonomous vehicle 402 in a standard manner, including by using friction to slow the wheels or engine braking. The brake unit 448b may include an anti-lock brake system (ABS) that can prevent the brakes from locking up when the brakes are applied. The navigation unit 448c may be any system configured to determine a driving path or route for the autonomous vehicle 402. The navigation unit 448c may additionally be configured to update the driving path dynamically while the autonomous vehicle 402 is in operation. In some embodiments, the navigation unit 448c may be configured to incorporate data from the GPS transceiver 446g and one or more predetermined maps to determine the driving path for the autonomous vehicle 402. The steering system 448d may represent any combination of mechanisms that may be operable to adjust the heading of autonomous vehicle 402 in an autonomous mode or in a driver-controlled mode.

The autonomous control unit 448e may represent a control system configured to identify, evaluate, and avoid or otherwise negotiate potential obstacles or obstructions in the environment of the autonomous vehicle 402. In general, the autonomous control unit 448e may be configured to control the autonomous vehicle 402 for operation without a driver or to provide driver assistance in controlling the autonomous vehicle 402. In some embodiments, the autonomous control unit 448e may be configured to incorporate data from the GPS transceiver 446g, the radar unit 446b, the LiDAR unit 446f, the cameras 446a, and/or other vehicle subsystems to determine the driving path or trajectory for the autonomous vehicle 402.

The network communication subsystem 492 may comprise network interfaces, such as routers, switches, modems, and/or the like. The network communication subsystem 492 may be configured to establish communication between the autonomous vehicle 402 and other systems, servers, etc. The network communication subsystem 492 may be further configured to send and receive data from and to other systems.

Many or all of the functions of the autonomous vehicle 402 can be controlled by the in-vehicle control computer 450. The in-vehicle control computer 450 may include at least one data processor 470 (which can include at least one microprocessor) that executes processing instructions 480 stored in a non-transitory computer-readable medium, such as the data storage device 490 or memory. The in-vehicle control computer 450 may also represent a plurality of computing devices that may serve to control individual components or subsystems of the autonomous vehicle 402 in a distributed fashion. In some embodiments, the data storage device 490 may contain processing instructions 480 (e.g., program logic) executable by the data processor 470 to perform various methods and/or functions of the autonomous vehicle 402, including those described with respect to FIGS. 1-6.

The data storage device 490 may contain additional instructions as well, including instructions to transmit data to, receive data from, interact with, or control one or more of the vehicle drive subsystem 442, the vehicle sensor subsystem 444, and the vehicle control subsystem 448. The in-vehicle control computer 450 can be configured to include a data processor 470 and a data storage device 490. The in-vehicle control computer 450 may control the function of the autonomous vehicle 402 based on inputs received from various vehicle subsystems (e.g., the vehicle drive subsystem 442, the vehicle sensor subsystem 444, and the vehicle control subsystem 448).

FIG. 5 shows an exemplary system 500 for providing precise autonomous driving operations. The system 500 may include several modules that can operate in the in-vehicle control computer 450, as described in FIG. 4. The in-vehicle control computer 450 may include a sensor fusion module 502 shown in the top left corner of FIG. 5, where the sensor fusion module 502 may perform at least four image or signal processing operations. The sensor fusion module 502 can obtain images from cameras located on an autonomous vehicle to perform image segmentation 504 to detect the presence of moving objects (e.g., other vehicles, pedestrians, etc.,) and/or static obstacles (e.g., stop sign, speed bump, terrain, etc.,) located around the autonomous vehicle. The sensor fusion module 502 can obtain LiDAR point cloud data item from LiDAR sensors located on the autonomous vehicle to perform LiDAR segmentation 506 to detect the presence of objects and/or obstacles located around the autonomous vehicle.

The sensor fusion module 502 can perform instance segmentation 508 on image and/or point cloud data items to identify an outline (e.g., boxes) around the objects and/or obstacles located around the autonomous vehicle. The sensor fusion module 502 can perform temporal fusion 510 where objects and/or obstacles from one image and/or one frame of point cloud data item are correlated with or associated with objects and/or obstacles from one or more images or frames subsequently received in time.

The sensor fusion module 502 can fuse the objects and/or obstacles from the images obtained from the camera and/or point cloud data item obtained from the LiDAR sensors. For example, the sensor fusion module 502 may determine based on a location of two cameras that an image from one of the cameras comprising one half of a vehicle located in front of the autonomous vehicle is the same as the vehicle captured by another camera. The sensor fusion module 502 may send the fused object information to the tracking or prediction module 546 and the fused obstacle information to the occupancy grid module 560. The in-vehicle control computer may include the occupancy grid module 560 which can retrieve landmarks from a map database 558 stored in the in-vehicle control computer. The occupancy grid module 560 can determine drivable areas and/or obstacles from the fused obstacles obtained from the sensor fusion module 502 and the landmarks stored in the map database 558. For example, the occupancy grid module 560 can determine that a drivable area may include a speed bump obstacle.

Below the sensor fusion module 502, the in-vehicle control computer 450 may include a LiDAR-based object detection module 512 that can perform object detection 516 based on point cloud data item obtained from the LiDAR sensors 514 located on the autonomous vehicle. The object detection 516 technique can provide a location (e.g., in 3D world coordinates) of objects from the point cloud data item. Below the LiDAR-based object detection module 512, the in-vehicle control computer may include an image-based object detection module 518 that can perform object detection 524 based on images obtained from cameras 520 located on the autonomous vehicle. The object detection 518 technique can employ a deep machine learning technique 524 to provide a location (e.g., in 3D world coordinates) of objects from the image provided by the camera 520.

The radar 556 on the autonomous vehicle can scan an area in front of the autonomous vehicle or an area towards which the autonomous vehicle is driven. The radar data may be sent to the sensor fusion module 502 that can use the radar data to correlate the objects and/or obstacles detected by the radar 556 with the objects and/or obstacles detected from both the LiDAR point cloud data item and the camera image. The radar data also may be sent to the tracking or prediction module 546 that can perform data processing on the radar data to track objects by object tracking module 548 as further described below.

The in-vehicle control computer may include an tracking or prediction module 546 that receives the locations of the objects from the point cloud and the objects from the image, and the fused objects from the sensor fusion module 502. The tracking or prediction module 546 also receives the radar data with which the tracking or prediction module 546 can track objects by object tracking module 548 from one point cloud data item and one image obtained at one time instance to another (or the next) point cloud data item and another image obtained at another subsequent time instance.

The tracking or prediction module 546 may perform object attribute estimation 550 to estimate one or more attributes of an object detected in an image or point cloud data item. The one or more attributes of the object may include a type of object (e.g., pedestrian, car, or truck, etc.). The tracking or prediction module 546 may perform behavior prediction 552 to estimate or predict the motion pattern of an object detected in an image and/or a point cloud. The behavior prediction 552 can be performed to detect a location of an object in a set of images received at different points in time (e.g., sequential images) or in a set of point cloud data items received at different points in time (e.g., sequential point cloud data items). In some embodiments, the behavior prediction 552 can be performed for each image received from a camera and/or each point cloud data item received from the LiDAR sensor. In some embodiments, the tracking or prediction module 546 can be performed (e.g., run or executed) to reduce computational load by performing behavior prediction 552 on every other or after every pre-determined number of images received from a camera or point cloud data item received from the LiDAR sensor (e.g., after every two images or after every three-point cloud data items).

The behavior prediction 552 feature may determine the speed and direction of the objects that surround the autonomous vehicle from the radar data, where the speed and direction information can be used to predict or determine motion patterns of objects. A motion pattern may comprise a predicted trajectory information of an object over a pre-determined length of time in the future after an image is received from a camera. Based on the motion pattern predicted, the tracking or prediction module 546 may assign motion pattern situational tags to the objects (e.g., "located at coordinates (x,y)," "stopped," "driving at 50 mph," "speeding up" or "slowing down"). The situation tags can describe the motion pattern of the object. The tracking or prediction module 546 may send the one or more object attributes (e.g., types of the objects) and motion pattern situational tags to the planning module 562. The tracking or prediction module 546 may perform an environment analysis 554 using any information acquired by system 500 and any number and combination of its components.

The in-vehicle control computer may include the planning module 562 that receives the object attributes and motion pattern situational tags from the tracking or prediction module 546, the drivable area and/or obstacles, and the vehicle location and pose information from the fused localization module 526 (further described below).

The planning module 562 can perform navigation planning 564 to determine a set of trajectories on which the autonomous vehicle can be driven. The set of trajectories can be determined based on the drivable area information, the one or more object attributes of objects, the motion pattern situational tags of the objects, location of the obstacles, and the drivable area information. In some embodiments, the navigation planning 564 may include determining an area next to the road where the autonomous vehicle can be safely parked in case of emergencies. The planning module 562 may include behavioral decision making 566 to determine driving actions (e.g., steering, braking, throttle) in response to determining changing conditions on the road (e.g., traffic light turned yellow, or the autonomous vehicle is in an unsafe driving condition because another vehicle drove in front of the autonomous vehicle and in a region within a pre-determined safe distance of the location of the autonomous vehicle). The planning module 562 performs trajectory generation 568 and selects a trajectory from the set of trajectories determined by the navigation planning operation 564. The selected trajectory information may be sent by the planning module 562 to the control module 570.

The in-vehicle control computer may include a control module 570 that receives the proposed trajectory from the planning module 562 and the autonomous vehicle location and pose from the fused localization module 526. The control module 570 may include a system identifier 572. The control module 570 can perform a model-based trajectory refinement 574 to refine the proposed trajectory. For example, the control module 570 can apply filtering (e.g., Kalman filter) to make the proposed trajectory data smooth and/or to minimize noise. The control module 570 may perform the robust control 576 by determining, based on the refined proposed trajectory information and current location and/or pose of the autonomous vehicle, an amount of brake pressure to apply, a steering angle, a throttle amount to control the speed of the vehicle, and/or a transmission gear. The control module 570 can send the determined brake pressure, steering angle, throttle amount, and/or transmission gear to one or more devices in the autonomous vehicle to control and facilitate precise driving operations of the autonomous vehicle.

The deep image-based object detection 524 performed by the image-based object detection module 518 can also be used detect landmarks (e.g., stop signs, speed bumps, etc.,) on the road. The in-vehicle control computer may include a fused localization module 526 that obtains landmarks detected from images, the landmarks obtained from a map database 536 stored on the in-vehicle control computer, the landmarks detected from the point cloud data item by the LiDAR-based object detection module 512, the speed and displacement from the odometer sensor 544 and the estimated location of the autonomous vehicle from the GPS/IMU sensor 538 (i.e., GPS sensor 540 and IMU sensor 542) located on or in the autonomous vehicle. Based on this information, the fused localization module 526 can perform a localization operation 528 to determine a location of the autonomous vehicle, which can be sent to the planning module 562 and the control module 570.

The fused localization module 526 can estimate pose 530 of the autonomous vehicle based on the GPS and/or IMU sensors 538. The pose of the autonomous vehicle can be sent to the planning module 562 and the control module 570. The fused localization module 526 can also estimate status (e.g., location, possible angle of movement) of the trailer unit based on (e.g., trailer status estimation 534), for example, the information provided by the IMU sensor 542 (e.g., angular rate and/or linear velocity). The fused localization module 526 may also check the map content 532.

Figure 6:
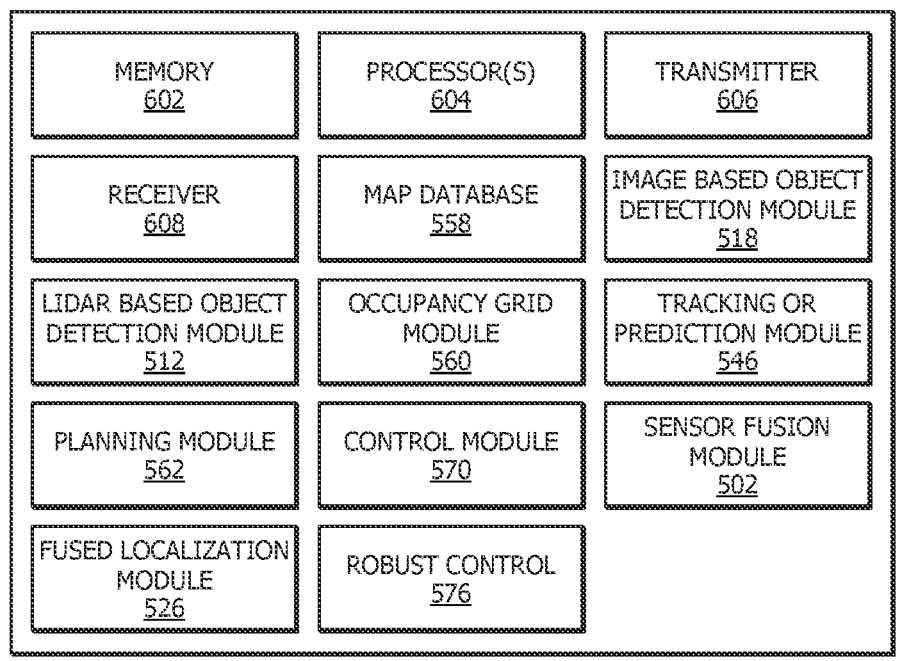
FIG. 6 illustrates a block diagram of an in-vehicle control computer included in the autonomous vehicle of FIG. 4.

FIG. 6 shows an exemplary block diagram of an in-vehicle control computer 450 included in an autonomous vehicle 402. The in-vehicle control computer 450 may include at least one processor 604 and a memory 602 having instructions stored thereupon (e.g., software instructions 128 and processing instructions 480 in FIGS. 1 and 4, respectively). The instructions, upon execution by the processor 604, configure the in-vehicle control computer 450 and/or the various modules of the in-vehicle control computer 450 to perform the operations described in FIGS. 1-6. The transmitter 606 may transmit or send information or data to one or more devices in the autonomous vehicle. For example, the transmitter 606 can send an instruction to one or more motors of the steering wheel to steer the autonomous vehicle. The receiver 608 receives information or data transmitted or sent by one or more devices. For example, the receiver 608 receives a status of the current speed from the odometer sensor or the current transmission gear from the transmission. The transmitter 606 and receiver 608 also may be configured to communicate with the plurality of vehicle subsystems 540 and the in-vehicle control computer 450 described above in FIGS. 4 and 5.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

Implementations of the disclosure can be described in view of the following clauses, the features of which can be combined in any reasonable manner.

Clause 1. A system, comprising:
  an autonomous vehicle configured to travel along a road, wherein the autonomous vehicle comprises at least one sensor;
  a control device associated with the autonomous vehicle and comprising a processor configured to:
    access sensor data captured by the at least one sensor;
    identify a vehicle of interest from the sensor data; and
    communicate information associated with the vehicle of interest to at least one of an oversight server and a third party.

Clause 2. The system of Clause 1, wherein communicating the information associated with the vehicle of interest to at least one of the oversight server and the third party is in response to:
  accessing an amber alert database, wherein the amber alert database comprises a plurality of amber alerts associated with a plurality of vehicles known to be associated with illegal activity;
  comparing the vehicle of interest with each of the plurality of vehicles; and
  determining that the vehicle of interest corresponds to a particular vehicle from among the plurality of vehicles.

Clause 3. The system of Clause 2, wherein comparing the vehicle of interest with each of the plurality of vehicles comprises:
  extracting a first set of features from an image of the vehicle of interest, wherein the first set of features represents physical attributes associated with the vehicle of interest;
  extracting a second set of features from each amber alert from among the plurality of amber alerts, wherein the second set of features represents physical attributes associated with a vehicle indicated in the amber alert; and
  comparing each feature from among the first set of features with a counterpart feature from among the second set of features.

Clause 4. The system of Clause 3, wherein determining that the vehicle of interest corresponds to the particular vehicle from among the plurality of vehicles comprises:
  determining a percentage of the first set of features that corresponds to the second set of features;
  comparing the percentage of the first set of features that corresponds to the second set of features with a threshold percentage; and
  determining that the percentage of the first set of features that corresponds to the second set of features exceeds the threshold percentage.

Clause 5. The system of Clause 1, wherein the information associated with the vehicle of interest comprises at least one of:
  a first image of at least a portion of the vehicle of interest;
  a second image of at least a portion of a plate associated with the vehicle of interest;
  a color of the vehicle of interest;
  a vehicle type;
  a vehicle make;
  a vehicle model;
  a direction of travel of the vehicle of interest;
  a speed of the vehicle of interest;
  a location where the vehicle of interest is encountered; or
  a timestamp when the vehicle of interest is encountered.

Clause 6. The system of Clause 1, wherein:
  identifying the vehicle of interest comprises processing the sensor data; and
  processing the sensor data comprises at least one of:
    recording a first image of at least a portion of the vehicle of interest;
    recording a second image of at least a portion of a plate associated with the vehicle of interest;
    determining a color of the vehicle of interest;
    determining a vehicle type;
    determining a vehicle make;
    determining a vehicle model;
    determining a direction of travel of the vehicle of interest;
    determining a speed of the vehicle of interest;
    determining a location where the vehicle of interest is encountered; or
    determining a timestamp when the vehicle of interest is encountered.

Clause 7. The system of Clause 1, wherein the third party comprises a regional law enforcement, a roadside assistance entity, a service provider, or any combination thereof.

Clause 8. A method comprising:
  accessing sensor data captured by a at least one sensor associated with an autonomous vehicle, wherein the autonomous vehicle is configured to travel along a road;
  identifying a vehicle of interest from the sensor data; and
  communicating information associated with the vehicle of interest to at least one of an oversight server and a third party.

Clause 9. The method of Clause 8, further comprising, by a control device associated with the autonomous vehicle, obtaining one or more amber alerts from one or more sources comprising:
  the oversight server;
  a law enforcement entity;
  a website associated with amber alerts;
  a road sign where an amber alert is indicated; or
  a text message via a cellular network.

Clause 10. The method of Clause 9, further comprising, by the control device, storing the one or more amber alerts in an amber alert database.

Clause 11. The method of Clause 8, further comprising obtaining, by the oversight server communicatively coupled with the autonomous vehicle, one or more amber alerts from one or more sources comprising:
- one or more autonomous vehicles;
- a law enforcement entity;
- a website associated with amber alerts; or
- a remote operator.

Clause 12. The method of Clause 11, further comprising, by the oversight server, storing the one or more amber alerts in an amber alert database.

Clause 13. The method of Clause 8, wherein the at least one sensor comprises at least one of a camera, light detection and ranging (LiDAR) sensor, motion sensor, and infrared sensor.

Clause 14. A non-transitory computer-readable medium storing instructions that when executed by at least one processor causes the at least one processor to:
- access sensor data captured by a at least one sensor associated with an autonomous vehicle, wherein the autonomous vehicle is configured to travel along a road;
- identify a vehicle of interest from the sensor data; and
- communicate information associated with the vehicle of interest to at least one of an oversight server and a third party.

Clause 15. The non-transitory computer-readable medium of Clause 14, wherein identifying the vehicle of interest comprises determining that the vehicle of interest is on a side of the road and not moving.

Clause 16. The non-transitory computer-readable medium of Clause 15, wherein communicating the information associated with the vehicle of interest to at least one of the oversight server and the third party is in response to:
- detecting a quick response (QR) code on the vehicle of interest; and
- determining the information encoded in the QR code, wherein the information comprises attributes associated with the vehicle of interest and one or more instructions.

Clause 17. The non-transitory computer-readable medium of Clause 16, wherein the attributes associated with the vehicle of interest comprises at least one of:
- a plate number;
- a vehicle model; or
- a location.

Clause 18. The non-transitory computer-readable medium of Clause 16, wherein the one or more instructions comprise:
- contacting the third party with particular contact information; and
- informing the third party that the vehicle of interest needs a particular service, wherein the particular service is associated with a low fuel level or a vehicle component malfunction.

Clause 19. The non-transitory computer-readable medium of Clause 16, wherein the one or more instructions are preconfigured by an owner of the vehicle of interest.

Clause 20. The computer program of Clause 16, wherein the QR code is displayed on at least one of a window and a body of the vehicle of interest.

The invention claimed is:

1. A system comprising:
   an autonomous vehicle configured to travel along a road, wherein the autonomous vehicle comprises at least one sensor;
   a control device associated with the autonomous vehicle and comprising at least one processor configured to:
   access sensor data captured by the at least one sensor;
   identify a vehicle of interest from the sensor data by determining that the vehicle of interest is on a side of the road and not moving; and
   communicate information associated with the vehicle of interest to at least one of an oversight server and a third party;
   wherein communicating the information associated with the vehicle of interest to at least one of the oversight server and the third party is in response to:
   detecting a quick response (QR) code on the vehicle of interest; and
   determining the information encoded in the QR code, wherein the information comprises one or more instructions preconfigured by an owner of the vehicle of interest, wherein the one or more instructions are prioritized based on a user's instructions; and
   wherein the information comprises information that the vehicle of interest needs a particular service.

2. The system of claim 1, wherein communicating the information associated with the vehicle of interest to at least one of the oversight server and the third party is in response to:
   accessing an amber alert database, wherein the amber alert database comprises a plurality of amber alerts associated with a plurality of vehicles known to be associated with illegal activity;
   comparing the vehicle of interest with each of the plurality of vehicles; and
   determining that the vehicle of interest corresponds to a particular vehicle from among the plurality of vehicles.

3. The system of claim 2, wherein comparing the vehicle of interest with each of the plurality of vehicles comprises:
   extracting a first set of features from an image of the vehicle of interest, wherein the first set of features represents physical attributes associated with the vehicle of interest;
   extracting a second set of features from each amber alert from among the plurality of amber alerts, wherein the second set of features represents physical attributes associated with a vehicle indicated in the amber alert; and
   comparing each feature from among the first set of features with a counterpart feature from among the second set of features.

4. The system of claim 3, wherein determining that the vehicle of interest corresponds to the particular vehicle from among the plurality of vehicles comprises:
   determining a percentage of the first set of features that corresponds to the second set of features;
   comparing the percentage of the first set of features that corresponds to the second set of features with a threshold percentage; and
   determining that the percentage of the first set of features that corresponds to the second set of features exceeds the threshold percentage.

5. The system of claim 1, wherein the information associated with the vehicle of interest comprises at least one of:

a first image of at least a portion of the vehicle of interest;
a second image of at least a portion of a plate associated with the vehicle of interest;
a color of the vehicle of interest;
a vehicle type;
a vehicle make;
a vehicle model;
a direction of travel of the vehicle of interest;
a speed of the vehicle of interest;
a location where the vehicle of interest is encountered; or
a timestamp when the vehicle of interest is encountered.

6. The system of claim 1, wherein:
identifying the vehicle of interest comprises processing the sensor data; and
processing the sensor data comprises at least one of:
recording a first image of at least a portion of the vehicle of interest;
recording a second image of at least a portion of a plate associated with the vehicle of interest;
determining a color of the vehicle of interest;
determining a vehicle type;
determining a vehicle make;
determining a vehicle model;
determining a direction of travel of the vehicle of interest;
determining a speed of the vehicle of interest;
determining a location where the vehicle of interest is encountered; or
determining a timestamp when the vehicle of interest is encountered.

7. The system of claim 1, wherein the third party comprises a regional law enforcement, a roadside assistance entity, a service provider, or any combination thereof.

8. A method comprising:
accessing sensor data captured by a at least one sensor associated with an autonomous vehicle, wherein the autonomous vehicle is configured to travel along a road;
identifying a vehicle of interest from the sensor data by determining that the vehicle of interest is on a side of the road and not moving; and
communicating information associated with the vehicle of interest to at least one of an oversight server and a third party;
wherein communicating the information associated with the vehicle of interest to at least one of the oversight server and the third party is in response to:
detecting a quick response (QR) code on the vehicle of interest; and
determining the information encoded in the QR code, wherein the information comprises one or more instructions preconfigured by an owner of the vehicle of interest, wherein the one or more instructions are prioritized based on a user's instructions; and
wherein the information comprises information that the vehicle of interest needs a particular service.

9. The method of claim 8, further comprising, by a control device associated with the autonomous vehicle, obtaining one or more amber alerts from one or more sources comprising:
the oversight server;
a law enforcement entity;
a website associated with amber alerts;
a road sign where an amber alert is indicated; or
a text message via a cellular network.

10. The method of claim 9, further comprising, by the control device, storing the one or more amber alerts in an amber alert database.

11. The method of claim 8, further comprising obtaining, by the oversight server communicatively coupled with the autonomous vehicle, one or more amber alerts from one or more sources comprising:
one or more autonomous vehicles;
a law enforcement entity;
a website associated with amber alerts; or
a remote operator.

12. The method of claim 11, further comprising, by the oversight server, storing the one or more amber alerts in an amber alert database.

13. The method of claim 8, wherein the at least one sensor comprises at least one of a camera, light detection and ranging (LiDAR) sensor, motion sensor, and infrared sensor.

14. A non-transitory computer-readable medium storing instructions that when executed by at least one processor causes the at least one processor to:
access sensor data captured by a at least one sensor associated with an autonomous vehicle, wherein the autonomous vehicle is configured to travel along a road;
identify a vehicle of interest from the sensor data by determining that the vehicle of interest is on a side of the road and not moving; and
communicate information associated with the vehicle of interest to at least one of an oversight server and a third party;
wherein communicating the information associated with the vehicle of interest to at least one of the oversight server and the third party is in response to:
detecting a quick response (QR) code on the vehicle of interest; and
determining the information encoded in the code, wherein the information comprises one or more instructions preconfigured by an owner of the vehicle of interest, wherein the one or more instructions are prioritized based on a user's instructions; and
wherein the information comprises information that the vehicle of interest needs a particular service.

15. The non-transitory computer-readable medium of claim 14, wherein the information further comprises attributes associated with the vehicle of interest.

16. The non-transitory computer-readable medium of claim 15, wherein the attributes associated with the vehicle of interest comprises at least one of:
a plate number;
a vehicle model; or
a location.

17. The non-transitory computer-readable medium of claim 15, wherein the one or more instructions comprise:
the particular service is associated with a low fuel level or a vehicle component malfunction.

18. The non-transitory computer-readable medium of claim 15, wherein QR code is displayed on at least one of a window and a body of the vehicle of interest.

* * * * *